July 15, 1969 T. J. PEARSALL 3,455,282

COMBUSTION CHAMBER FOR BURNING ANHYDROUS AMMONIA

Filed Sept. 25, 1967

INVENTOR.
THOMAS J. PEARSALL
BY
Hauke, Knass & Gifford
ATTORNEYS

United States Patent Office

3,455,282
Patented July 15, 1969

3,455,282
COMBUSTION CHAMBER FOR BURNING ANHYDROUS AMMONIA
Thomas J. Pearsall, Grosse Pointe Farms, Mich., assignor to Continental Aviation and Engineering Corporation, Detroit, Mich., a corporation of Virginia
Filed Sept. 25, 1967, Ser. No. 670,145
Int. Cl. F02b 23/08; F02p 1/00, 13/00
U.S. Cl. 123—1                                    8 Claims

ABSTRACT OF THE DISCLOSURE

A combustion chamber for use with an internal combustion spark-ignition engine for burning ammonia as a fuel such that the location of the gap formed by the extended electrodes of the spark plug is substantially at the center of mass of the combustion chamber when the piston is at top dead center position.

BACKGROUND OF THE INVENTION

Field of the invention

The present invention relates to internal combustion engines, for burning ammonia as a fuel and more particularly to a combustion chamber designed for burning ammonia without the use of supplementary fuels.

Description of the art

The advantages of providing an internal combustion engine of the spark-ignition type that burns ammonia in place of hydrocarbon fuels have long been recognized. Although at the present time ammonia costs approximately ten times as much as hydrocarbon fuels for the same amount of energy, there exists some situations where it would be feasible and practical to use ammonia as a fuel. An example would be a military operation in remote temperate or tropic areas where hydrocarbon fuels are not available. Under these conditions the use of an energy depot that would produce electrical power and heat such that this energy could in turn be harnessed to produce ammonia for military vehicles appears as a practical solution.

Still another instance where the use of ammonia as a fuel might be practicable would be a situation where the military had appropriated all the petroleum fuels, leaving nothing for use by the civilian population. In this type of situation commercial sources of ammonia could be employed to produce fuel for the civilian population.

The prior art has proposed heretofore to design an ammonia fuel spark ignition reciprocating engine by either using a conventional engine that is supercharged above current automotive practices or an engine that would be supercharged only moderately and the compression ratio would be increased necessitating the addition of hydrogen to the ammonia fuel. Up until now it has been considered necessary to use an additive substance such as hydrogen with the ammonia, in order to promote the combustion and accelerate the burning of the ammonia.

SUMMARY OF THE INVENTION

The present invention overcomes the aforementioned prior art difficulties in using ammonia alone as a fuel for an internal combustion engine by means of a combustion chamber formed in a compacted substantially spherical shape in combination with a spark plug having long reach electrodes such that the spark gap is positioned substantially at the center of mass of the combustion chamber. It is a further concept of applicant's invention that the engine should employ a high energy ignition source, such as supplied by a magneto, together with an increase in the spark plug gap to obtain a long duration spark. Applicant's invention further contemplates that the engine should have a relatively high compression ratio of the order of 12:1 to 16:1.

It is therefore an object of the present invention to provide a combustion chamber design for an internal combustion engine that will burn ammonia as a fuel.

Another object of the present invention is the provision of a combustion chamber design in combination with an ammonia fuel internal combustion engine wherein combustion is initiated as near the center of mass of the combustible mixture as possible.

A further object of the invention is to provide an internal combustion engine using pure anhydrous ammonia as a fuel.

Still another object of the invention is to provide an anhydrous ammonia fuel internal combustion engine employing a substantially spherical combustion chamber having a high energy engine ignition source in combination with an optimum spark gap, located at the center of the chamber.

A final object of the invention is the provision of an ignition means for an internal combustion engine wherein its design and location provide for burning of ammonia as a fuel.

DESCRIPTION OF THE PREFERRED EMBODIMENTS

Figures 1, 2, 3:
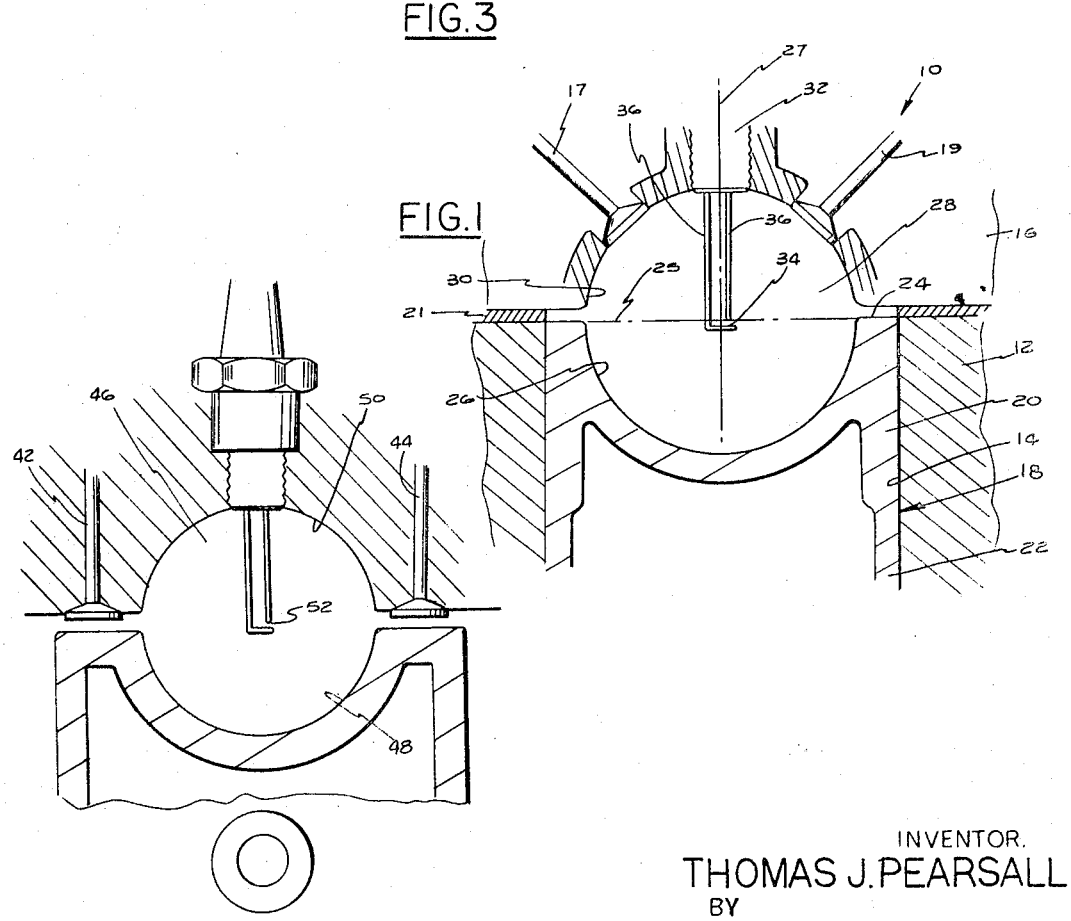
FIG. 1 is a fragmentary cross-sectional view of one cylinder of an engine, illustrating various features of the present invention.
FIG. 2 is a view similar to FIG. 1, but showing a modified structure.
FIG. 3 is a view similar to FIG. 1, showing still another form of the invention.

Referring more particularly to the drawings, in FIG. 1 an internal combustion engine is illustrated generally by the numeral 10 and is shown to include an engine block 12 containing the usual cylinder 14. A cylinder head 16 is located above the engine block 12 and valves 17 and 19 are positioned in the cylinder head 16. The head 16 may be bolted to the block 12 upon a cylinder gasket indicated at 21.

Each of the cylinders 14 of the engine 10 contains a reciprocating piston 18 which is illustrated as having a head 20 and a skirt 22. The head 20 is provided with a substantially planar face 24.

A cavity 26 is provided in the face 24 and extends into the head 20 forming a part of a combustion chamber 28 of the engine 10. It will be noted that the cavity 26 is formed as a hemisphere or half sphere with the completed sphere's center located at the intersection of a horizontal centerline 25 and a vertical centerline 27 when the piston 18 is at the maximum upper position, as shown.

The remaining half of the combustion chamber 28 is formed substantially by a second half sphere cavity 30 formed in the head 16 of the engine 10. It will be thus seen that when the piston 18 is raised to its foremost upper position the two cavities 26 and 30 form a combustion chamber 28 that is substantially spherical in shape and which has its center located at the intersection of the lines 25 and 27.

A spark plug, partially indicated at 32, is secured in the head 16 in such a way that the spark gap 34, formed by the long electrodes 36, will be positioned substantially at the center of mass or volume of the combustion chamber 28. The spark plug has electrodes of an extra long reach to enable the spark gap to be located at the center of mass of the combustion chamber 28 without interfering with the substantially spherical shape of the chamber 28.

Applicant's unique combination of combustion chamber structure and location of the spark gap is to be contrasted with the usual practice for hydrocarbon fuel engines wherein the spark gap is located at one side of the combustion chamber so as to initiate combustion at such point thereby permitting the flame front to progress across the combustion chamber. However, with anhydrous ammonia fuel which has a low rate of flame propagation of the order of two thirds the rate of hydrocarbon fuel it has been discovered by applicant to be critical to the successful operation, to initiate combustion as near the center of mass of the combustible mixture as possible. Thus, by applicant's combustion chamber structure having a compacted spherical shape, together with the location of the spark gap at the center of mass of the combustion chamber, it was possible to obtain satisfactory performance of an internal combustion engine using only pure ammonia. The performance equals or exceeds the performance of a conventional combustion chamber using ammonia in combination with a flame propagating agent such as hydrogen.

FIGURE 2 shows a construction in which valve members 42 and 44 are located at each side of a combustion chamber 46. In this embodiment of applicant's invention, generally hemispherical shaped portions 48 and 50 of the combustion chamber 46 are not able to have their uppermost and bottommost surface centers, respectively located at the spark gap 52 due to clearance required for the operation of the valves. However, this fact is balanced by the reduction in volume of the chamber 46 to thereby increase the compression ratio of the engine.

Applicant prefers his ammonia engine to have a relatively high compression ratio of the order of 12:1 to 16:1. Having a compression ratio within this range produces a large improvement in performance, particularly at high speeds. Also, applicant has found that the optimum compression ratio for spark ignition engines burning ammonia should be about 16:1, because of the great increase in flame propagation rates as the compression ratio is increased above 16:1.

In FIGURE 3, a combustion chamber cavity 60 is shown in the form of the major portion of a sphere that is formed by a wall 61 extending inwardly into a head 62 of a piston 64. A lip 66 defines the entrance to the combustion chamber cavity 60 allowing the entrance of the long electrodes 68 of the spark plug, partially indicated at 70. Here again a compact chamber is provided such that the gap 72 of the electrodes 68 is positioned at substantially the center of mass of the chamber cavity 60. The modification illustrated in FIG. 3, is a further compromise between an ideal spherical chamber approached by the structure of FIG. 1 and the more practical engine construction wherein a higher compression ratio is obtainable.

Another important feature of applicant's combustion system is the size of the spark plug gap. It was found that in order to obtain maximum power a spark gap within the range of 0.070 to 0.120 inch was necessary. In this regard, it was found that if the spark plug gap was increased beyond the range mentioned above, so as to be greater than the clearance between the center electrode and the body of the plug, a severe deterioration in performance will result. This upper limitation apparently results because the plug sparks between the center electrode and the outer wall of the plug creating a multiplicity of small sparks, rather than one high strength spark at the gap.

It is to be understood however that while the factors of the compression ratio and the spark gap size are important in developing optimum performance, applicant's engine is able to operate satisfactorily primarily because of the location of the spark plug gap at the center of mass of the combustion chamber at top dead center of the piston travel.

Attaining peak power from applicant's engine is a factor of the type of ignition system employed with the engine. It was found that an induction type ignition system produces a substantial increase in both peak power obtainable and maximum permissible operating speed when compared to the results obtained from a capacity discharge ignition system. Still greater increases in power were obtained when a magneto-type ignition system was employed with applicant's engine. The reason for this can be explained by the fact that ammonia fuel operates most efficiently with a large, hot spark having a long duration. Thus, by using an induction type spark ignition system providing a spark duration in the range of 0.5 millisecond, the large, hot spark, long duration conditions were attained to achieve this increase in peak power.

It should be noted that the above discussion relative to the spark-plug gap and spark-ignition energy source applies to all forms of applicant's invention shown in FIGS. 1–3 wherein a compacted combustion chamber approaching a true spherical shape is desired with the spark gap located substantially at the center of mass of the chamber.

While the instant invention is not intended to be limited to the use of pure anhydrous ammonia as a fuel, it is of importance to note that one result of applicant's concept is that a practical spark-ignition engine has been disclosed that will operate with pure anhydrous ammonia as a fuel. Due to the low rate of flame propagation, performance of the spark-ignition, ammonia-fueled engine decreases at engine speeds above 3000 r.p.m. High speed output, above this speed, can be increased substantially by the addition of very small quantities (1.5 percent) of hydrogen.

As stated initially, applicant's invention has important utility in military use. In this connection, it was found that a standard gasoline fuel spark-ignition engine operates using ammonia as a fuel by replacing the conventional spark plugs having center electrodes substantially flush with the cylinder head, with selected extra long reach spark plugs of the type shown in FIGS. 1–3. By means of this type of spark plug having an electrode reach such that the spark gap is located substantially at the center mass of the combustion chamber at top dead center, the engine operated successfully using ammonia as a fuel.

Applicant's invention also encompasses use with compression ignition engines such as a conventional Diesel engine. It was found that conversion of a Diesel engine, by installing a spark ignition system of the magneto type, together with insertion of long reach spark plugs in the fuel injection nozzle apertures, resulted in an engine that operated successfully using ammonia as a fuel. Due to the fact that Diesel engines have a higher compression ratio than standard gasoline-fueled engines, it was found that a Diesel engine, in this respect, lends itself more advantageously to conversion for ammonia combustion. It should also be noted that both the converted spark-ignition and compression ignition engines operated successfully using pure anhydrous ammonia as the fuel.

Obviously, many modifications and variations of the present invention are possible in light of the above teachings. It is therefore to be understood that the invention may be practiced within the scope of the appended claims, otherwise than as specifically described.

I claim:

1. An internal combustion engine utilizing ammonia as a fuel comprising:
   (a) a cylinder bore slidably receiving a piston therein said piston having a curved upper surface,
   (b) a cylinder head closing said bore and together with said curved upper surface of said piston defining a substantially spherical combustion chamber therebetween, and
   (c) spark ignition means including electrodes that extend from the approximate surface of said combustion chamber and which project into said chamber to form a spark gap which is located substantially at the center of mass of the combustion chamber.

2. An engine as defined in claim 1, wherein the compression ratio is in the range of 12:1 to 16:1.

3. An engine as defined in claim 1, wherein said spark ignition means is located substantially on the axis of said bore.

4. An engine as defined in claim 1, wherein the spark gap has a dimension within the range of 0.070 of an inch to 0.120 of an inch to provide a long duration spark.

5. An engine as defined in claim 1, wherein an ignition system employed with said engine is of a type supplying ignition energy producing a spark duration of approximately 0.5 millisecond.

6. An engine as defined in claim 1, wherein the fuel used is pure anhydrous ammonia.

7. An engine as defined in claim 5, wherein the ignition energy source is a magneto.

8. An engine as defined in claim 1, wherein hydrogen of the order of 1.5 percent is added to the ammonia fuel to increase the rate of flame propagation.

References Cited

FOREIGN PATENTS

| | | |
|---|---|---|
| 262,813 | 7/1928 | Great Britain. |
| 745,342 | 3/1944 | Germany. |

OTHER REFERENCES

Society of automotive engineers, Pub. No. 660156, Jan. 10–14, 1966, pages 1–4, 8, 9, 11, 14–18, 485 Lexington Ave., New York 17, N.Y.

WENDELL E. BURNS, Primary Examiner

U.S. Cl. X.R.

123—169, 191